US008573189B2

(12) United States Patent
Porten et al.

(10) Patent No.: US 8,573,189 B2
(45) Date of Patent: Nov. 5, 2013

(54) METHOD FOR OPERATING AN INTERNAL COMBUSTION ENGINE, COMPUTER PROGRAM PRODUCT, COMPUTER PROGRAM, AND CONTROL AND/OR REGULATION DEVICE FOR AN INTERNAL COMBUSTION ENGINE

(75) Inventors: Guido Porten, Vaihingen/Enz (DE); Thomas Wortmann, Nonnweiler (DE); Jean-Marc Fries, Speisen-Elversberg (DE)

(73) Assignee: Robert Bosch GmbH, Stuttgart (DE)

( * ) Notice: Subject to any disclaimer, the term of this patent is extended or adjusted under 35 U.S.C. 154(b) by 654 days.

(21) Appl. No.: 11/704,035

(22) Filed: Feb. 7, 2007

(65) Prior Publication Data

US 2007/0199551 A1 Aug. 30, 2007

(30) Foreign Application Priority Data

Feb. 7, 2006 (DE) ......................... 10 2006 005 503

(51) Int. Cl.

*F02D 41/00* (2006.01)
*F02M 7/00* (2006.01)
*G06F 19/00* (2011.01)
*G06G 7/70* (2006.01)

(52) U.S. Cl.

USPC ............................ 123/673; 123/435; 701/111

(58) Field of Classification Search

USPC ......... 123/673, 436, 688, 690, 434, 435, 674, 123/695; 701/109, 114, 103, 104, 111, 115; 73/114.01, 114.36; 702/182, 183, 185

See application file for complete search history.

(56) References Cited

U.S. PATENT DOCUMENTS

| | | | | | |
|---|---|---|---|---|---|
| 4,121,548 | A * | 10/1978 | Hattori et al. | ................. | 123/479 |
| 5,568,725 | A * | 10/1996 | Uchikawa | ....................... | 60/274 |
| 5,758,632 | A * | 6/1998 | Yamashita et al. | ............ | 123/688 |
| 5,778,855 | A * | 7/1998 | Czekala et al. | .......... | 123/406.27 |
| 5,829,247 | A | 11/1998 | Zhang | | |
| 5,913,299 | A * | 6/1999 | Shimizu et al. | ............... | 123/436 |
| 5,918,584 | A * | 7/1999 | Kato | ............................ | 123/681 |
| 6,032,659 | A * | 3/2000 | Yamashita et al. | ............ | 123/674 |
| 6,138,638 | A * | 10/2000 | Morikawa | ..................... | 123/295 |
| 6,170,465 | B1 * | 1/2001 | Shomura | ....................... | 123/436 |
| 6,176,220 | B1 * | 1/2001 | Mashiki | ........................ | 123/436 |

(Continued)

FOREIGN PATENT DOCUMENTS

| | | |
|---|---|---|
| DE | 44 15 994 | 11/1995 |
| JP | 7-310570 | 11/1995 |
| JP | 11-44611 | 2/1999 |

*Primary Examiner* — Stephen K Cronin
*Assistant Examiner* — Sizo Vilakazi
(74) *Attorney, Agent, or Firm* — Kenyon & Kenyon LLP

(57) ABSTRACT

In a method for operating an internal combustion engine, a computer program product, a computer program, and a control and/or regulation device for the internal combustion engine, the internal combustion engine is allowed to be operated using an enriched air/fuel mixture, without exceeding a rich combustion limit of the internal combustion engine. In the process, a setpoint value for a variable characterizing the air/fuel mixture is specified in at least one operating state of the internal combustion engine. A value of at least one variable characterizing the quality of combustion is determined. The determined value for the at least one variable characterizing the quality of combustion is compared to a first specified threshold value. If the determined value for the at least one variable characterizing the quality of combustion deviates from the first specified threshold value by an amount that exceeds a second specified threshold value, then the setpoint value is corrected.

12 Claims, 2 Drawing Sheets

(56) References Cited

U.S. PATENT DOCUMENTS

| | | | | |
|---|---|---|---|---|
| 6,470,868 | B2 * | 10/2002 | Nakagawa et al. | 123/673 |
| 6,598,589 | B2 * | 7/2003 | Frelund et al. | 123/435 |
| 6,895,934 | B2 * | 5/2005 | Kirschke et al. | 123/434 |
| 6,904,792 | B2 * | 6/2005 | Wakahara | 73/114.39 |
| 6,962,140 | B1 * | 11/2005 | Nakai et al. | 123/436 |
| 7,063,081 | B2 * | 6/2006 | Yamada | 123/688 |
| 7,163,007 | B2 * | 1/2007 | Sasaki et al. | 123/673 |
| 7,254,474 | B2 * | 8/2007 | Iihoshi et al. | 701/109 |
| 7,412,820 | B2 * | 8/2008 | Iida et al. | 60/274 |

* cited by examiner

METHOD FOR OPERATING AN INTERNAL COMBUSTION ENGINE, COMPUTER PROGRAM PRODUCT, COMPUTER PROGRAM, AND CONTROL AND/OR REGULATION DEVICE FOR AN INTERNAL COMBUSTION ENGINE

CROSS-REFERENCE TO RELATED APPLICATIONS

The present application claims priority to Application No. 10 2006 005 503.9, filed in the Federal Republic of Germany on Feb. 7, 2006, which is expressly incorporated herein in its entirety by reference thereto.

FIELD OF THE INVENTION

The present invention relates to a method for operating an internal combustion engine, a computer program product, a computer program, and a control and/or regulation device for an internal combustion engine.

BACKGROUND INFORMATION

According to conventional methods for operating an internal combustion engine, a setpoint value for a variable characterizing the air/fuel mixture is specified in at least one operating state of the internal combustion engine.

In particular, this is the case in Lambda control in which an actual value for an oxygen concentration in the exhaust gas, which characterizes the air/fuel mixture in the combustion chamber, i.e., an actual Lambda value, is adapted to a setpoint Lambda value as a setpoint value for the oxygen concentration in the exhaust gas characterizing the air/fuel mixture.

Furthermore, German Published Patent Application No. 44 15 994 describes a control system for an internal combustion engine, which enriches the air/fuel mixture supplied to the internal combustion engine if a threshold value of a signal that indirectly or directly indicates the efficiency of the internal combustion engine is not attained. The enriching prevents that the exhaust gas temperature, which increases as the efficiency of the internal combustion engine decreases, assumes values that become so high that damage occurs to the discharge valves or the exhaust gas system, in particular the exhaust-gas catalyst.

SUMMARY

According to example embodiments of the present invention, a method for operating an internal combustion engine, a computer program product, a computer program, and a control and/or regulation device for an internal combustion engine may provide that a value of at least one variable, which characterizes the quality of the combustion, is ascertained, the ascertained value for the at least one variable characterizing the quality of the combustion is compared to a first specified threshold value, and the setpoint value is corrected in the case of a deviation between the ascertained value for the at least one variable characterizing the quality of the combustion and the first specified threshold value, whose amount exceeds a second specified threshold value. This effects an adaptation of the setpoint value, which, given suitable input of the first specified threshold value, provides that the quality of the combustion is not unintentionally made worse when the actual value for the variable characterizing the air/fuel mixture is adapted to the setpoint value. For example, a setpoint value specified for enriching the air/fuel mixture is able to be adapted such that a rich combustion limit of the internal combustion engine is not exceeded under any circumstances. Undesired combustion misses and interference in the smooth running of the internal combustion engine are thereby able to be prevented. This is true even if an oxygen concentration in the exhaust gas of the internal combustion engine as a variable that characterizes the air/fuel mixture is measured not by a continuous Lambda oxygen sensor in the exhaust branch of the internal combustion engine, but by a two-step Lambda oxygen sensor, which is able to differentiate only between a lean and rich air/fuel mixture, but is unable to provide any quantitative information about the degree of enrichment or leaning.

The setpoint value may be corrected in a stepwise manner, if a value of the at least one variable characterizing the quality of combustion is ascertained after each correction step, if it is ascertained after each correction step whether the amount of the deviation between the ascertained value for the at least one variable characterizing the quality of combustion and the first specified threshold value exceeds the second specified threshold value, if the setpoint value is corrected in this case in an additional correction step, and if, otherwise, the correction of the setpoint value is terminated and the corrected setpoint value, available following the most recently implemented correction step, is specified as the new setpoint value. In this manner, the setpoint value is able to be iteratively corrected or adapted in an especially uncomplicated manner. In the process, through selection of the amount of the correction steps, a compromise is able to be achieved between a fastest possible setpoint value adaptation on the one hand, and a most precise setpoint value adaptation possible on the other hand.

In addition, after termination of the correction, the corrected setpoint value may be specified as new setpoint value only if the amount of the corrected setpoint value deviates from the uncorrected setpoint value by no more than a third specified threshold value. By suitable selection of the third specified threshold value, it is thereby prevented that errors in the combustion not caused by, for instance, ageing or manufacturing or installation tolerances of components of the internal combustion engine are compensated by an adaptation of the setpoint value, whereas they should actually be remedied by repairs since they have an unintended detrimental effect on the performance of the internal combustion engine.

It may be provided that after termination of the correction, a fault will be detected if the amount of the corrected setpoint deviates from the uncorrected setpoint value by more than the third specified threshold value.

The setpoint value may be specified for each cylinder individually, if the value of the at least one variable characterizing the quality of the combustion is ascertained individually for each cylinder, if the ascertained value for the at least one variable characterizing the quality of the combustion for at least one cylinder of the internal combustion engine is compared to the first specified threshold value, and if the setpoint value is corrected if for at least one cylinder of the internal combustion engine in which the amount of a deviation between the ascertained value for the at least one variable characterizing the quality of the combustion and the first specified threshold value exceeds the second specified threshold value. In this manner, the adaptation of the setpoint value is able to be realized individually for each cylinder, so that, in an enrichment of the air/fuel mixture, the internal combustion engine is able to be operated in even closer proximity to the rich combustion limit, or, in an enleanment of the air/fuel mixture, in even closer proximity to the lean combustion limit of the internal combustion engine, than would be possible in an adaptation of the setpoint value for all cylinders, i.e., without a cylinder-individual differentiation.

The setpoint value may be specified for enrichment of the air/fuel mixture and corrected in the direction of an enleanment. Analogously, the setpoint value may be specified for enleanment of the air/fuel mixture and corrected in the direction of an enrichment. A number of combustion misses during a specified time interval, or irregular running of the internal combustion engine, may be selected as especially suitable variables characterizing the quality of combustion. Especially suitable as a variable characterizing the air/fuel mixture is the selection of a Lambda value or an oxygen concentration of the exhaust gas.

Exemplary embodiments of the present invention are described in more detail below with reference to the appended Figures.

DETAILED DESCRIPTION

Figure 1:
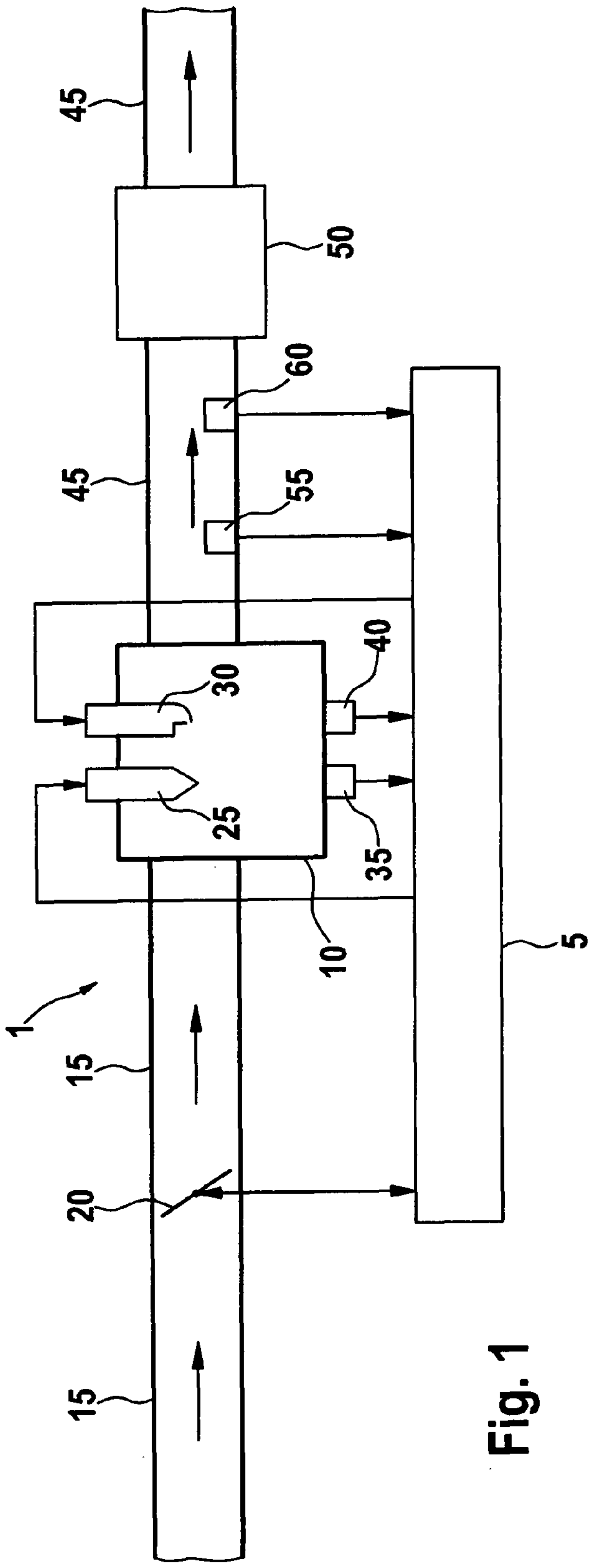
FIG. 1 is a block diagram of an internal combustion engine.

In FIG. 1, 1 designates an internal combustion engine, which drives a vehicle, for example. Internal combustion engine 1 may be configured as an Otto engine or a Diesel engine, for instance. In the following text, it should be understood by way of example that internal combustion engine 1 takes the form of a spark-ignition engine. Internal combustion engine 1 includes one or a plurality of cylinder(s) 10, of which one is shown in FIG. 1 by way of example. Via an air supply 15, fresh air is supplied to cylinder(s) 10 of the internal combustion engine. The flow direction of the fresh air in air supply 15 is indicated by arrows in FIG. 1. Disposed in air supply 15 is a throttle valve 20, whose position is set by an engine control 5, for instance, as a function of an activation degree of a driving pedal. Furthermore, throttle valve 20 may have position-feedback, for instance, in the form of a throttle valve potentiometer, which records the position of throttle valve 20 and transmits a corresponding measuring signal to engine control 5. Fuel is directly injected into cylinder(s) 10 via a fuel injector 25 in each case. As an alternative, a fuel injector assigned to all cylinders 10, which injects fuel into air supply 15, may be disposed upstream or downstream from throttle valve 20 in air supply 15, from where it reaches individual cylinders 10. Fuel injector(s) 25 is/are triggered by engine control 5 to inject a specified quantity of fuel during a specified time interval, for instance, in order to adjust a specified setpoint value for an oxygen concentration in the exhaust gas. In addition, a spark plug 30 is assigned to each cylinder 10 to ignite the air/fuel mixture supplied to the combustion chamber of each cylinder 10. The particular spark plug 30 is controlled by engine control 5 so as to adjust a desired point of ignition, for example, with a view to a torque reserve to be set for the internal combustion engine, or with a view to desired heating of a catalytic converter 50 disposed in exhaust branch 45 of internal combustion engine 1. An engine speed sensor 40 in the region of cylinders 10 records the engine speed and forwards a corresponding measuring signal to engine control 5. In addition or as an alternative to engine speed sensor 40, each cylinder 10 may be assigned an individual cylinder pressure sensor 35, which measures the internal cylinder pressure, i.e., the pressure inside the combustion chamber of the particular cylinder assigned in each case, and forwards a corresponding measuring signal to engine control 5. The exhaust gas formed in cylinders 10 or their combustion chamber during combustion of the air/fuel mixture is expelled into exhaust branch 45. The flow direction of the exhaust gas in exhaust branch 45 is indicated by arrows in FIG. 1. Optionally, and as illustrated in FIG. 1, a catalytic converter 50 may be disposed in exhaust branch 45. According to FIG. 1, an exhaust gas temperature sensor 60, which measures the temperature in the exhaust branch and forwards a corresponding measuring signal to engine control 5, is disposed in exhaust branch 45, upstream from catalytic converter 50. In addition, according to FIG. 1, a Lambda oxygen sensor 55, which measures the oxygen concentration in the exhaust gas and forwards a corresponding measuring signal to engine control 5, is also disposed upstream from catalytic converter 50. Lambda oxygen sensor 55 may be, for example, a continuous Lambda oxygen sensor or a two-step Lambda oxygen sensor. The latter may distinguish only between rich and lean exhaust gas but is unable to provide any quantitative information about the exhaust gas composition, i.e., in particular, the degree of enrichment or enleanment. The method described in the following text requires no continuous Lambda oxygen sensor, but is also able to be implemented by a two-step Lambda oxygen sensor. In the final analysis, the presence of a Lambda oxygen sensor is not even required for the method of functioning of the method described in the following text.

Furthermore, a mass air-flow sensor, for instance, in the form of a hot-film air mass meter or an ultrasonic air mass meter, which measures the mass air flow supplied to cylinders 10 and forwards a corresponding measuring signal to engine control 5, may be disposed upstream from throttle valve 20 in air supply 15.

In the case of an internal combustion engine 1 arranged as a Diesel engine, spark plugs 30, and throttle valve 20 usually as well, are not provided, and engine control 5 controls fuel injector 25 with respect to the injection quantity and the injection time also, for instance, as a function of the position of the driving pedal.

Optionally, it is also possible to provide an exhaust gas turbocharger having a compressor in air supply 15, upstream from throttle valve 20 and a turbine in exhaust branch 45 upstream from catalytic converter 50 and downstream from Lambda oxygen sensor 55 and temperature sensor 60.

In order to protect the components, an enrichment of the air/fuel mixture is usually implemented in cylinders 10 if critical exhaust gas temperatures have been reached for components in exhaust branch 45, such as catalytic converter 50 or an exhaust gas turbine or an exhaust gas manifold. In the process, additionally introduced fuel, for example, leads to an enrichment of the air/fuel mixture. Due to thermodynamic processes, this cools the mentioned components in exhaust branch 45 that are at risk. The required degree of enrichment, and thus the setpoint value for a variable characterizing the air/fuel mixture, is determined by the required cooling effect and under no circumstances must exceed the so-called rich combustion limit of the internal combustion engine. If the rich combustion limit is exceeded by the air/fuel mixture ratio in one or a plurality of cylinder(s) 10, then combustion misses and undesired irregular running could occur. These are avoided by the method described in the following text.

It is possible, for instance, to select the air/fuel mixture ratio, in the form of a Lambda value or an oxygen concentration of the exhaust gas, as a variable that characterizes the air/fuel mixture. In the following text, it is assumed by way of example that the variable characterizing the air/fuel mixture is selected to be the oxygen concentration of the exhaust gas. Engine control systems equipped with only a two-step Lambda oxygen sensor or Lambda regulation are unable to carry out a direct or quantitative determination or measurement of the oxygen concentration in the exhaust gas, and thus an adjusted degree of enrichment. In this context, engine control 5 may specify a setpoint value for the oxygen concentration in the exhaust gas that is to be implemented with the aid of a pilot control and/or an automatic control. However, if the two-step Lambda oxygen sensor is used, it is impossible to quantitatively determine an actual value for the oxygen concentration in the exhaust gas. The setpoint value for the oxygen concentration in the exhaust gas is thus realized by a pilot control, for instance, with the aid of a characteristic curve or a characteristics map. Here, different setpoint values for the oxygen concentration in the exhaust gas for particular operating points of the internal combustion engine are assigned a particular fuel quantity to be injected. Characteristic curves or characteristics maps may be suitably applied on a test stand and/or in test drives, for instance. With the aid of two-step Lambda oxygen sensor 55 in exhaust branch 45, it is then monitored only whether, given a desired enrichment of the air/fuel mixture, an enrichment has actually taken place and, given a desired enleanment of the air/fuel mixture, whether an enleanment has actually come about.

Due to the tolerances of the pilot control and ageing of components such as fuel injector 25, for instance, as well as manufacturing tolerances of components such as, for example, fuel injector 25, it cannot be ruled out that, if an applied setpoint value for the oxygen concentration in the exhaust gas for enriching the air/fuel mixture has insufficient clearance with respect to the rich combustion limit, the rich combustion limit is exceeded when a specified setpoint value for the oxygen concentration in the exhaust gas is implemented. This results in sporadic combustion misses and undesired irregular running. However, depending on the engine arrangement and operating state of internal combustion engine 1, an enrichment of the air/fuel mixture as closely as possible to the rich combustion limit is required in order to provide sufficient and rapid cooling of the components in exhaust branch 45 such as, for instance, catalytic converter 50 and the turbine of an exhaust gas turbocharger as well as the exhaust gas manifold. It is impossible to detect the exceeding of the rich combustion limit with the aid of two-step Lambda oxygen sensor 55.

It is therefore provided that a value of at least one variable characterizing the quality of the combustion is ascertained; that the ascertained value for the at least one variable characterizing the quality of combustion is compared to a first specified threshold value; and, in the case of a deviation between the ascertained value for the at least one variable characterizing the quality of the combustion and the first specified threshold value by an amount that exceeds a second specified threshold value, the setpoint value for the variable characterizing the air/fuel mixture—e.g., the oxygen concentration in the exhaust gas—is corrected. Selectable as a variable characterizing the quality of combustion is, for instance, the aforedescribed irregular running of internal combustion engine 1. It may be derived by engine control 5 from the engine speed signal of engine speed sensor 40, e.g., in a conventional manner. In the process, irregularities in the rotational speed characteristic are analyzed. In addition or as an alternative, it is also possible to select the number of combustion misses detected within a specific time interval as a variable characterizing the quality of combustion. The detection of such combustion misses may be implemented, e.g., in a conventional manner, for instance, by analyzing the pressure inside the cylinders using pressure sensor(s) 35.

That is to say, when implementing a setpoint value for a variable characterizing the air/fuel mixture—in this example, the oxygen concentration in the exhaust gas—it is checked whether, for example, the deviation between the number of combustion misses during the specified time interval and a first threshold value specified for this purpose amounts to more than a second threshold value specified to that end. The first specified threshold value may be applied as empirical value, which describes the expected number of combustion misses during the specified time interval not resulting from an exceeding of the rich combustion limit. This also depends on the specified time interval during which the number of combustion misses is determined. It may be applied using a margin that is at least large enough to allow a sufficient number of combustion misses to be detected in the event that the rich combustion limit is exceeded, so that a reliable correction of the setpoint value may be implemented. On the other hand, the applied margin should not be too large, in order to keep the adaptation time to a minimum. In a simplest case, the first specified threshold value is set to zero. The second specified threshold value is used to take tolerances into account that are to be allowed for the deviation between the number of combustion misses during the specified time interval and the first specified threshold value, without an exceeding of the rich combustion limit being inferred immediately. In a simplest case, the second specified threshold value may be set to zero as well.

An analogous procedure may be employed if irregular running is used as the variable characterizing the quality of combustion. In that instance, the ascertained value for the irregular running is compared to a first threshold value specified for that purpose, and the setpoint value is corrected if the ascertained value for the irregular running deviates from the first threshold value specified for that purpose by an amount that exceeds a second threshold value specified to that end. Here, the irregular running may be used as an alternative to the number of combustion misses during the specified time interval as a variable characterizing the quality of combustion. However, both the number of combustion misses during the specified time interval and the irregular running may be monitored for the described adaptation of the setpoint value. In this instance, the setpoint value is corrected only if both the number of combustion misses during the specified time interval deviates in its amount from the first threshold value specified to that end by more than the second threshold value specified for that purpose, and if the amount of the deviation in the irregular running from the first threshold value specified for that purpose is greater than the second threshold value specified to that end.

A setpoint value for an enrichment of the air/fuel mixture is considered, which may have the undesired result that the rich combustion limit is exceeded. For that reason, the correction of the setpoint value includes an enleanment, i.e., an increase in the setpoint value for the oxygen concentration in the exhaust gas.

The correction of the setpoint value may be implemented in one or several steps. Accordingly, such a correction step may be applied on a test stand and/or in test drives, for instance. In the present example, it may also be provided that only one correction step or otherwise also a plurality of correction steps is allowed for the setpoint value. If a plurality of correction steps is allowed, a value of the variable characterizing the quality of combustion or, one value in each case of the variables characterizing the quality of combustion, is determined after each correction step. Following each correction step, it will then be checked whether the amount of the deviation between the ascertained value for the variable characterizing the quality of combustion and the first threshold value provided for this purpose exceeds the second threshold value specified to that end, or whether the amount of the deviation between the ascertained value for the variables characterizing the quality of combustion and the threshold value specified to that end exceeds the particular second threshold value provided for that purpose, in which case the setpoint value is corrected in an additional correction step and, otherwise, the correction of the setpoint value is terminated and the corrected setpoint value available after the most recently implemented correction step is specified and implemented as the new setpoint value. The correction amount for the setpoint value may be specified to be of equal size for each correction step. However, it may also be specified individually for each correction step, for instance, the higher or the smaller, the greater the number of correction steps. If one correction step is allowed, its magnitude is suitably applied on a test stand and/or in test drives, such that it is able to be provided that the rich combustion limit will no longer be able to be exceeded once the setpoint value has been corrected. If a stepwise correction of the setpoint value is allowed, the magnitude of the correction step or of the different correction steps may be applied on a test stand and/or in test drives, for instance, such that, on the one hand, the corrected setpoint value available after conclusion or termination of the correction of the setpoint value allows internal combustion engine 1 to be operated in the closest possible proximity to the rich combustion limit and, on the other hand, it is provided that the rich combustion limit will not be exceeded and, thirdly, the number of correction steps required to this end is kept as low as possible.

After terminating or concluding the correction of the setpoint value, it is optionally possible to check how strongly the corrected setpoint then available deviates from the originally specified, uncorrected setpoint value. Only if the amount of this deviation is not greater than a third specified threshold value will the corrected setpoint value be specified and implemented as the new setpoint value. Otherwise, a fault will be detected and the corrected setpoint value not specified and implemented. The third specified threshold value may be suitably applied on a test stand and/or in test drives, for instance, such that correction amounts that are caused by pilot control tolerances or component ageing or component manufacturing tolerances are to be compensated by the corrected setpoint value, whereas correction values resulting from faulty pilot controls or malfunctions of the components such as fuel injector 25, spark plug 30 and/or throttle valve 20, are not to be compensated by the corrected setpoint value in order to prevent damage to internal combustion engine 1 and allow repairs to be made as a result of the fault indication.

The setpoint value for the variable characterizing the air/fuel mixture—in the present example, the oxygen concentration in the exhaust gas—may be specified individually for each cylinder. In this instance, the value of the variable characterizing the quality of combustion, or the particular value of the variables characterizing the quality of combustion, is determined in a cylinder-individual manner. In the present example, that would mean that the value for the irregular running and/or the value for the number of combustion misses during the specified time interval is determined in a cylinder-individual manner from the characteristic of the engine speed and the known ignition sequence of the cylinders in the case of irregular running, or from the characteristic of the pressure inside the cylinders in the case of the number of combustion misses during the specified time interval, e.g., in a conventional manner. For at least one individual cylinder 10 of internal combustion engine 1, the determined value for the variable characterizing the quality of combustion is compared to the first threshold value specified for that purpose. As an alternative, for at least one of cylinders 10 of internal combustion engine 1, the particular ascertained value for the variables characterizing the quality of combustion is compared to the particular first threshold value specified for that purpose. For at least one of cylinders 10 of internal combustion engine 1 for which the amount of a deviation between the ascertained value for the variable characterizing the quality of combustion and the first threshold value specified for that purpose exceeds the second threshold value specified to that end, the setpoint value will be corrected. As an alternative, for at least one of cylinders 10 of internal combustion engine 1 for which the amount of a deviation between the particular ascertained value for the variables characterizing the quality of combustion and the particular first threshold value specified for this purpose exceeds the particular second threshold value specified to that end, the setpoint value will be corrected.

As an alternative, the setpoint value is specified as shared setpoint value for a plurality of, in particular all, cylinders 10 of internal combustion engine 1, and the value of the variable characterizing the quality of combustion, or the particular value of the variables characterizing the quality of combustion, is ascertained jointly for this plurality of cylinders 10. The determined value for the variable characterizing the quality of combustion for this plurality of cylinders 10 of the internal combustion engine is compared to the first threshold value specified for that purpose. As an alternative, the particular determined value for the variables characterizing the quality of combustion for this plurality of cylinders 10 of internal combustion engine 1 is compared to the particular first threshold value specified for that purpose. Subsequently, for this plurality of cylinders 10 of internal combustion engine 1 for which the amount of a deviation between the ascertained value for the variable characterizing the quality of combustion and the first threshold value specified for that purpose exceeds the second threshold value specified for this purpose, the setpoint value will be corrected. Alternatively, for this plurality of cylinders 10 of internal combustion engine 1 for which the amount of the deviation between the particular ascertained value for the variables characterizing the quality of combustion and the particular first threshold value specified for that purpose exceeds the particular second threshold value specified to that end, the setpoint value for this plurality of cylinders 10 of internal combustion engine 1 will be corrected.

As already mentioned, if a plurality of variables characterizing the quality of combustion is used, the setpoint value is corrected only if the amount of the deviation between the particular ascertained value and the particular first threshold value specified for this purpose exceeds the particular second threshold value specified to that end for all used variables characterizing the quality of combustion. However, as an alternative, if a plurality of variables characterizing the quality of combustion is used, it may also be provided to allow the correction of the setpoint value also as soon as the amount of the deviation between the ascertained value and the first threshold value specified for this purpose exceeds the second threshold value specified for this purpose for one of the selected variables characterizing the quality of combustion.

In the previously described example, the input of a setpoint value for the oxygen concentration in the exhaust gas was described, which leads to an enrichment of the air/fuel mixture and which is corrected in the direction of an enleanment if the rich combustion limit is exceeded. Analogously to the afore-described example, a setpoint value may conversely be specified for an enleanment of the air/fuel mixture and the setpoint value corrected in the direction of an enrichment if a lean combustion limit is not attained, which also manifests itself in combustion misses and undesired irregular running.

Figure 2:
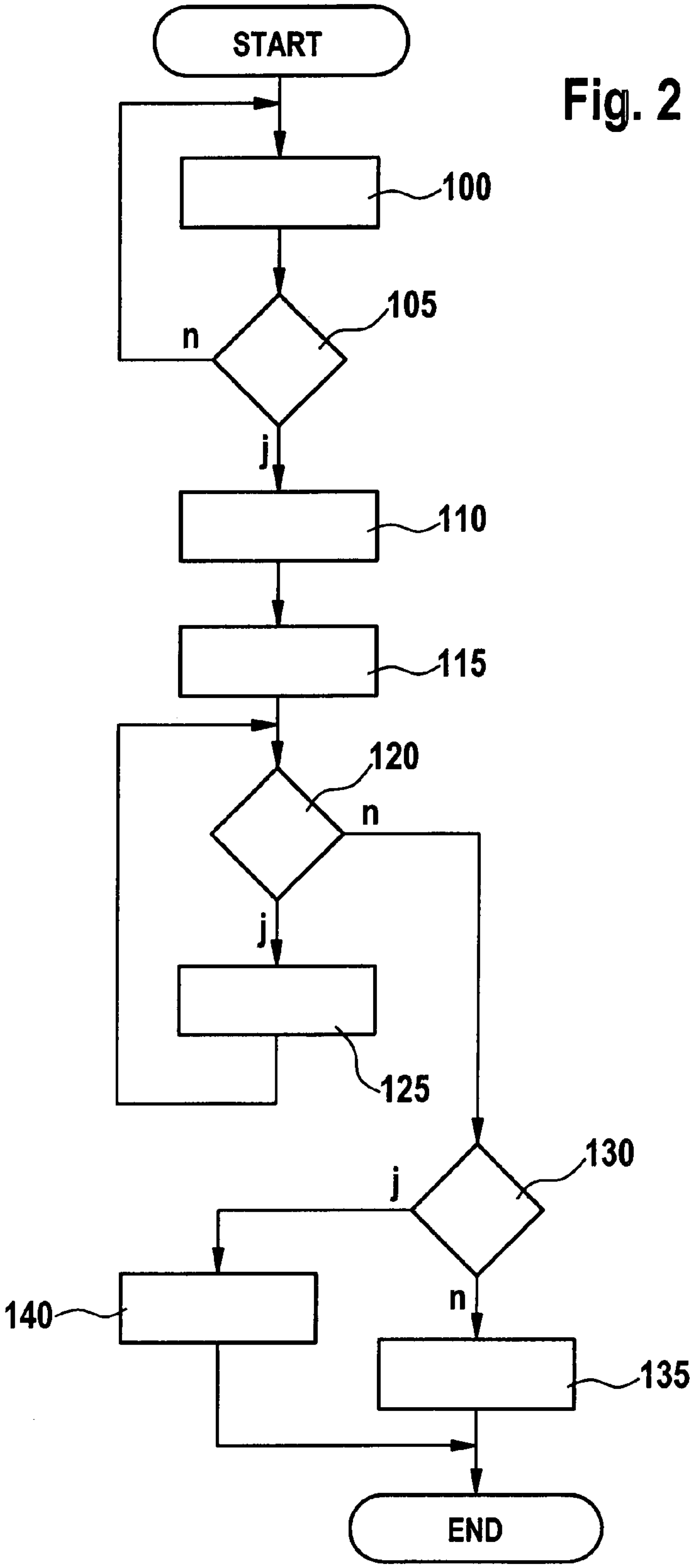
FIG. 2 is a flow chart for an exemplary sequence of a method according to an example embodiment of the present invention.

FIG. 2 is a flow chart for an exemplary sequence of a method according to an example embodiment of the present invention. Once the program is started, engine control 5 determines the instantaneous exhaust gas temperature in a program point 100, using the measuring signal received from exhaust gas temperature sensor 60. Furthermore, in program point 100, engine control 5 sets an overall correction amount Δ to the zero value. Branching to a program point 105 takes place subsequently.

In program point 105, engine control 5 checks whether the exhaust gas temperature is greater than a specified threshold value. If this is the case, branching to a program point 110 occurs. Otherwise, it is returned to program point 100. The threshold value for the exhaust gas temperature is suitably applied on a test stand and/or in test drives, for example, such that it represents the exhaust gas temperature up to which damage to components in exhaust branch 45, such as catalytic converter 50 or a turbine of an exhaust gas turbocharger or the exhaust manifold, may reliably be ruled out, but which, when exceeded, may entail damage to these components.

In program point 110, engine control 5 initiates the inputting of the setpoint value for the oxygen concentration in the exhaust gas with regard to an enrichment of the air/fuel mixture, in a cylinder-individual manner or jointly for several or all of the cylinders. This setpoint value is implemented by the described pilot control, e.g., by increasing the injected fuel quantity while keeping the mass air flow to cylinders 10 unchanged. In the following text, a cylinder-individual specification of the setpoint value is to be assumed by way of example. Branching to a program point 115 takes place subsequently.

In program point 115, engine control 5 determines the number of combustion misses for each cylinder during the specified time interval as an example of a variable characterizing the quality of combustion, e.g., in a conventional manner, and using the signal of the particular internal cylinder pressure sensor 35. Subsequently, branching to a program point 120 takes place.

In program point 120, engine control 5 checks whether for one of cylinders 10 the amount of the deviation between the number of combustion misses during the specified time interval and the first threshold value specified for this purpose exceeds the second threshold value specified to that end. If this is the case, it is branched to a program point 125. Otherwise, branching to a program point 130 takes place.

In program point 125, engine control 5 initiates the individual formation of a new overall correction value L as the sum of the last valid overall correction value and a correction value δ specified for this correction step, for the particular cylinder(s) 10 of internal combustion engine 1 for which the amount of the deviation between the number of combustion misses during the specified time interval and the first threshold value specified for this purpose exceeds the second threshold value specified to that end. In program point 125, a new overall correction value $\Delta=\delta+\Delta$ is therefore assigned to every cylinder for which the amount of the deviation between the number of combustion misses during the specified time interval and the first threshold value specified for this purpose exceeds the second threshold value specified to that end. Subsequently, it is branched back to a program point 120. If no further cylinder is detected in program point 120 for which the amount of the deviation between the number of combustion misses during the specified time interval and the first threshold value specified for this purpose exceeds the second threshold value provided to that end, branching to program point 130 takes place.

In program point 130, engine control 5 checks for each cylinder 10 of internal combustion engine 1 whether the amount of assigned determined overall correction value Δ exceeds the third specified threshold value. For the cylinders for which this is the case, branching to a program point 140 takes place. Branching to a program point 135 occurs for the remaining cylinders.

The particular cylinders for which in the course of the described method sequence no deviation is ever detected between the number of combustion misses during the specified time interval and the first threshold value specified for that purpose, the amount of this deviation exceeding the second threshold value specified for this purpose, continue to have the initial value of zero as overall correction value Δ.

In program point 140, an error is detected and possibly indicated for the particular cylinders for which the amount of overall correction value Δ is greater than the third specified threshold value.

The error detection may additionally and optionally result in an operation under emergency conditions of internal combustion engine 1, e.g., by suppressing the fuel injection to the affected cylinders whose overall correction value Δ is greater in its amount than the third specified threshold value. In a worst case, internal combustion engine 1 may also be turned off entirely. The program is then exited.

For those cylinders for which the amount of overall correction value Δ is smaller than or equal to the third specified threshold value, the new setpoint value for the oxygen concentration in the exhaust gas will be formed in program point 135 from the sum of the uncorrected setpoint value, as it was present in program point 100, and overall correction value Δ assigned to the particular cylinder. The new setpoint value is then input and implemented, in particular at an unchanged mass air flow to cylinders 10, via a corresponding reduction of the fuel injection into these cylinders. The program is then exited.

In the previously described exemplary embodiment, where an enrichment of the air/fuel mixture is to be achieved by the specified setpoint value, and where the setpoint value is a setpoint value for the oxygen concentration in the exhaust gas, correction value δ is greater than zero, and resulting overall correction value Δ is greater than or equal to zero. In this manner, the setpoint value is increased or remains the same by the overall correction value, which goes hand in hand with, respectively, an increase and keeping constant of the required oxygen concentration in the exhaust gas, and thus with an enleanment or keeping constant of the air/fuel mixture.

If the setpoint value for the oxygen concentration in the exhaust gas is specified jointly for all cylinders of internal combustion engine 1, then the sequence up to and including program point 120 is the same as the previously described sequence. However, in program point 125, the setpoint value shared by all cylinders is considered, and its assigned overall correction value Δ is increased by correction value δ. In program point 130, the amount of shared overall correction value Δ is compared to the third specified threshold value, and if the third specified threshold value is exceeded by the amount of shared overall correction value Δ, then branching to program point 140 occurs, the error is indicated, and an operation of internal combustion engine 1 under emergency conditions may possibly be initiated. In program point 135, the new setpoint value for the oxygen concentration in the exhaust gas is formed jointly for all cylinders 10, by adding shared overall correction value Δ to the uncorrected setpoint value, as it was available in program point 100. To set the new setpoint value, the injection into all cylinders of the internal combustion engine will be reduced if overall correction value Δ is greater than zero. This may be realized both in the case of joint injection into air supply 15 and in the case of the direct injection into individual cylinders 10. However, if the setpoint value for the oxygen concentration in the exhaust gas is specified individually for each cylinder, then a joint injection of fuel into air supply 15 in contrast to a direct injection makes little sense, for in this case only a direct injection allows a successful individual implementation of the cylinder-individual setpoint values.

That is to say, the method according to example embodiments of the present invention may effectively avoid an undesired operation of internal combustion engine 1 beyond the rich combustion limit even if Lambda oxygen sensor 55 is designed as two-step and not as continuous Lambda oxygen sensor. Damage to components in the exhaust branch such as catalytic converter 50, a turbine of the exhaust turbocharger and/or an exhaust manifold, may therefore be avoided, and the drivability of internal combustion engine 1 or the vehicle it is driving may be improved due to the achieved cooling of the mentioned components in exhaust branch 45 as a result of the realized enrichment of the air/fuel mixture to be combusted in cylinders 10 of internal combustion engine 1 as closely as possible to the rich combustion limit.

The flow chart according to FIG. 2 may be realized, for instance, as a computer program in a microprocessor of engine control 5. To this end, the computer program may be stored on a machine-readable carrier such as a memory medium, so that the machine-readable carrier forms a computer program product together with the program code of the computer program. The memory media may be fixedly implemented in engine control 5 or supplied to engine control 5 via a drive. Engine control 5 constitutes a control and/or regulation device for internal combustion engine 1.

As a result, the exceeding of the threshold value for the exhaust gas temperature represents an operating state of internal combustion engine 1, in which a setpoint value for the variable characterizing the air/fuel mixture is specified in the form of, for instance, a specified degree of enrichment. As an alternative and as described in German Published Patent Application No. 44 15 994, such an operating state of internal combustion engine 1 may be achieved even if a threshold value of a signal indicating an efficiency of the internal combustion engine indirectly or directly, is not attained.

If irregular running is used as the variable characterizing the quality of combustion, a value for the irregular running may be specified in the form of the first specified threshold value. If this specified value for the irregular running then actually comes about, then a correction of the setpoint value for the variable characterizing the air/fuel mixture is not required. With the aid of the second specified threshold value, a tolerance band is placed around the first specified value as specified value for the irregular running, within which the irregular running may vary without this being attributable to an exceeding of the rich combustion limit, and therefore without an intention that this should lead to a correction of the setpoint value for the variable characterizing the air/fuel mixture. The first specified threshold value and the second specified threshold value for the irregular running may also be applied in a suitable manner on a test stand and/or in test drives.

If the number of combustion misses during the specified time interval is selected as the variable characterizing the quality of combustion, the first specified threshold value and/or the second specified threshold value may also be selected to be equal to zero. On the other hand, in this instance as well, the first specified threshold value may also be selected as a specified value for the number of combustion misses during the specified time interval not caused by operating internal combustion engine 1 beyond the rich combustion limit. The second specified threshold value may once again place a tolerance band around the first specified threshold value, within which a variation in the number of combustion misses is permitted to both sides of the first specified threshold value, such combustion misses not yet leading to an exceeding of the rich combustion limit. Here, too, the first specified threshold value and the second specified threshold value may be applied in suitable fashion on a test stand and/or in test drives.

What is claimed is:

1. A method for operating an internal combustion engine, comprising:

specifying a setpoint value for a variable characterizing an air/fuel mixture in at least one operating state of the internal combustion engine;

ascertaining a value of at least one variable characterizing a quality of combustion;

comparing the ascertained value for the at least one variable characterizing the quality of the combustion to a first specified threshold value; and correcting the setpoint value if the ascertained value for the at least one variable characterizing the quality of the combustion deviates from the first specified threshold value by an amount that exceeds a second specified threshold value.

2. The method according to claim 1, wherein:

the setpoint value is corrected in a stepwise manner;

a value of the at least one variable characterizing the quality of combustion is ascertained after each correction;

it is checked after each correction step whether the amount of the deviation between the ascertained value for the at least one variable characterizing the quality of combustion and the first specified threshold value is greater than the second specified threshold value; and the setpoint value is corrected in an additional correction step if the amount of the deviation between the ascertained value for the at least one variable characterizing the quality of combustion and the first specified threshold value is greater than the second specified threshold value, and, otherwise, the correction of the setpoint value is terminated and the corrected setpoint value available after the most recently implemented correction step is specified as a new setpoint value.

3. The method according to claim 1, wherein the corrected setpoint value is specified as a new setpoint value only if after termination of the correction an amount of the corrected setpoint value deviates from an uncorrected setpoint value by no more than a third specified threshold value.

4. The method according to claim 3, wherein a fault is detected if after termination of the correction the amount of the corrected setpoint value deviates from the uncorrected setpoint value by more than the third specified threshold value.

5. The method according to claim 1, wherein:

the setpoint value is specified individually for each cylinder;

a value of the at least one variable characterizing the quality of combustion is determined individually for each cylinder;

the ascertained value for the at least one variable characterizing the quality of combustion for at least one cylinder of the internal combustion engine is compared to the first specified threshold value, and the setpoint value is corrected for at least one cylinder of the internal combustion engine in which an amount of a deviation between the ascertained value for the at least one variable characterizing the quality of combustion and the first specified threshold value exceeds the second specified threshold value.

6. The method according to claim 1, wherein the setpoint value for an enrichment of the air/fuel mixture is specified and the setpoint value is corrected in a direction of an enleanment.

7. The method according to claim 1, wherein the setpoint value for an enleanment of the air/fuel mixture is specified and the setpoint value is corrected in a direction of an enrichment.

8. The method according to claim 1, wherein a number of combustion misses in a specified time interval is selected as a variable characterizing the quality of combustion.

9. The method according to claim 1, wherein irregular running of the internal combustion engine is selected as a variable characterizing the quality of combustion.

10. The method according to claim 1, wherein at least one of (a) an oxygen concentration of an exhaust gas and (b) a Lambda value is selected as a variable characterizing the air/fuel mixture.

11. A computer-readable medium having stored thereon instructions adapted to be executed by a processor, the instructions which, when executed, cause the processor to perform a method for operating an internal combustion engine, the method including:

specifying a setpoint value for a variable characterizing an air/fuel mixture in at least one operating state of the internal combustion engine;

ascertaining a value of at least one variable characterizing a quality of combustion;

comparing the ascertained value for the at least one variable characterizing the quality of the combustion to a first specified threshold value; and correcting the setpoint value if the ascertained value for the at least one variable characterizing the quality of the combustion deviates from the first specified threshold value by an amount that exceeds a second specified threshold value.

12. A control and/or regulation device for an internal combustion engine, comprising:

means for specifying a setpoint value for a variable characterizing an air/fuel mixture in at least one operating state of the internal combustion engine;

means for ascertaining a value of at least one variable characterizing a quality of combustion;

means for comparing the ascertained value for the at least one variable characterizing the quality of the combustion to a first specified threshold value; and means for correcting the setpoint value if the ascertained value for the at least one variable characterizing the quality of the combustion deviates from the first specified threshold value by an amount that exceeds a second specified threshold value.

* * * * *